United States Patent [19]
Bergstrom

[11] Patent Number: 4,783,170
[45] Date of Patent: * Nov. 8, 1988

[54] READOUT FOR A RING LASER GYRO USING A PLATINUM BEAM SPLITTER

[75] Inventor: James W. Bergstrom, New Brighton, Minn.

[73] Assignee: Honeywell Inc., Minneapolis, Minn.

[*] Notice: The portion of the term of this patent subsequent to Dec. 15, 2004 has been disclaimed.

[21] Appl. No.: 861,895

[22] Filed: May 12, 1986

Related U.S. Application Data

[63] Continuation-in-part of Ser. No. 665,414, Oct. 26, 1984, Pat. No. 4,712,917.

[51] Int. Cl.$^4$ .................. G01C 19/64; G02B 27/14
[52] U.S. Cl. .................... 356/350; 350/171; 372/94
[58] Field of Search .............. 356/350; 372/94; 350/171

[56] References Cited

FOREIGN PATENT DOCUMENTS 440006 2/1935 United Kingdom ............... 350/171

Primary Examiner—Vincent P. McGraw
Attorney, Agent, or Firm—Robert A. Pajak

[57] ABSTRACT

A symmetrical prismatic readout apparatus includes a pair of substantially identical prism elements positioned in back-to-back relationship with respect to each other to provide a symmetrical structure. The prism elements have bonding surfaces in which one includes a thin film platinum coating. The bonding surfaces are bonded together through optical bonding, without the use of adhesives. The platinum film forms a beam splitter. The two prism elements are similarly bonded to a substrate element, again by optical bonding, without the use of adhesives. Suitable beam splitter arrangements are provided to effect the desired readouts.

4 Claims, 1 Drawing Sheet

READOUT FOR A RING LASER GYRO USING A PLATINUM BEAM SPLITTER

This application is a continuation-in-part of U.S. application Ser. No. 665,414, filed 26 Oct. 1984 now U.S. Pat. No. 4,712,917.

BACKGROUND OF THE INVENTION

The present invention relates to a ring laser angular rate sensor, a so-called ring laser gyro. More particularly it relates to a readout apparatus for such a ring laser gyro.

A so-called ring laser gyroscope is basically a laser apparatus having a ring type resonant cavity, typically triangular in configuration. The laser beam is directed around the triangular path by suitable mirrors positioned at each of the corners of the triangular structure. In most cases there are two laser beams traveling in opposite directions relative to each other around the ring. The positioning of the mirrors in the corners of the ring, or triangle, direct the laser beams down the channels of the resonant cavity. At one of the corners, the mirror must take the form of a so-called beam splitter. There a portion of each of the laser beams is reflected into the resonating cavity while another portion of each of the beams is transmitted through the mirror into a readout assembly. Some examples of ring laser gyros are shown and described in U.S. Pat. Nos. 3,373,650; 3,390,606; 3,467,472; and 4,152,071, all of which are assigned to the assignee of the present application, and are herein incorporated by reference thereto. The readout apparatus for such ring laser gyros, as noted in the aforementioned patents, have been in the form of either a single beam readout arrangement or in the form of a so-called double beam readout arrangement, each having its own unique characterics.

In a co-pending U.S. application Ser. No. 482,665, filed Apr. 6, 1983, in the name of Stephen Callaghan and assigned to the assignee of the present invention, there is disclosed a readout assembly which features both single and double beam type readouts. In that application, herein incorporated by reference thereto, there is presented a symmetrical arrangement of two prismatic elements which are secured to each other at a common face by a suitable optical cement and both elements are similarly cemented to a substrate block. Although such stucture has provided significant improvements in the readout capabilities of the associated ring laser gyro, it has been found that the use of such cements or adhesives has lead to instabilities, stresses and warpage of parts. Additionally, the use of such adhesives has further involved long and tedious assembly requiring fine adjustments as the adhesives cure.

SUMMARY OF THE INVENTION

In accordance with the present invention, a symmetrical prismatic readout apparatus which includes a pair of substantially identical prism elements positioned in back-to-back relationship with respect to each other to provide a symmetrical structure. Each of the prism elements has a first bonding surface. One of the bonding surfaces is coated with a thin film platinum coating to form a beam splitter. The pair of prism elements are bonded together at the first bonding surface through optical bonding, without the use of adhesives. The two prism elements are similarly bonded to a substrate element, again by optical bonding, without the use of adhesives. Suitable beam splitter arrangements are provided to effect the desired readouts.

BRIEF DESCRIPTIONS OF THE DRAWINGS

A better understanding of the present invention may be had from the following detailed description when read in connection with the accompanying drawing, in which:

The single figure is a fragmentary diagram of a ring laser gyro having a readout structure embodying the present invention.

DETAILED DESCRIPTION

Figure 1:
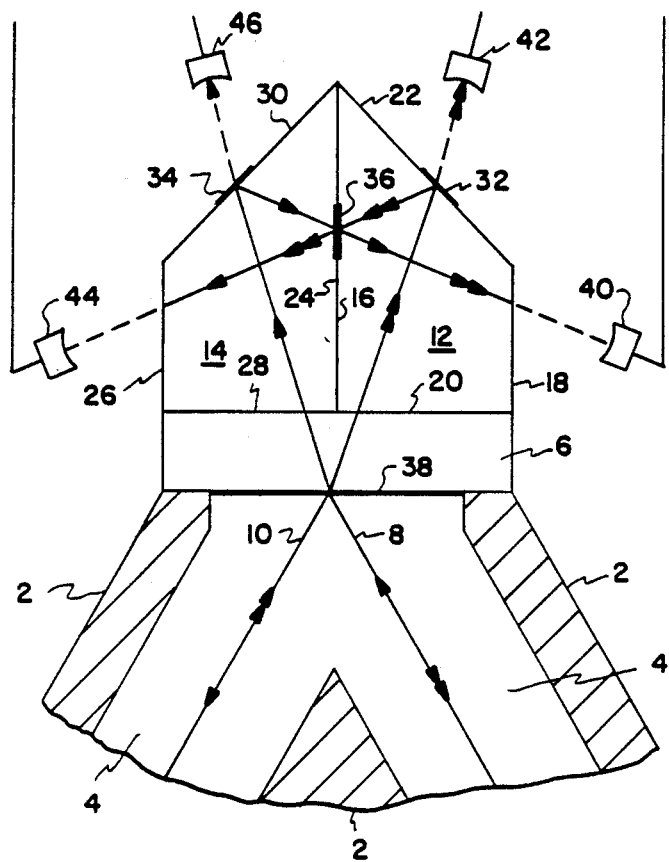

Referring, now, to the drawings in more detail, there is shown, in the single figure, a fragmentary diagram representing one corner, the readout corner, of a ring laser gyro of the type basically shown in U.S. Pat. Nos. 3,390,606 and 3,581,227, which are incorporated herein by reference. As in those patents, a thermally and mechanically stable block 2 has formed therein a resonant cavity 4. The cavity is sealed at each of the corners by a reflective element substrate 6. In the examplary embodiment, there are three such corners with suitable reflector substrates sealing each of the three corners. The thus defined cavity 4, accordingly, comprises a closed loop cavity. The cavity is filled with a suitable lasing gas in accordance with well-established principles for a laser gain medium. By suitable exciting means, not here illustrated and forming no part of the present invention, is provided for introducing into the gas filled cavity 4 a first and a second laser beam 8 and 10, respectively. The two laser beams are arranged to travel in opposite directions about the closed loop or ring of the assembly in accordance with established principles. The reflector element 6 includes a substrate and having one major face thereof constituting a so-called beam splitter whereby a portion of each of the 2 impinging laser beams are transmitted through the substrate 6, and a larger portion is reflected back into the cavity 4.

The prismatic readout structure includes a first prism element 12 and a second prism 14. The prism 12 is provided with a first and third surface 16 and 18 which are parallel with respect to each other. The second surface 20 is perpendicular to both of those two surfaces 16 an 18. A fourth surface is formed at a predetermined angle with respect to the first surface. In the exemplary embodiment, the fourth surface 22 of the prism 12 was at an angle of approximately 45° with respect to the surface 18.

The second prism 14 is substantially identical in construction, having a first surface 24 and a third surface 26 which are essentially parallel, and a second surface 28 which is mutually perpendicular to the two surfaces 24 an 26. A fourth surface 30 is, again, at the predetermined angle with respect to the surface 24.

The positioning of the prisms 12 and 14 is such as to present a symmetrical arrangement, with the surfaces 20 and 28 coplaner and the surfaces 16 and 24 in contiguous juxtaposition. The coplaner surfaces 20 and 28 are positioned in contiguous juxtaposition with respect to the outer major surface of the substrate 6. A beam splitter coating 32 is applied to the fourth surface 22 of the prism element 12.

Similarly, a second beam splitter coating 34 is applied to the fourth surface 30 of the prism element 14. The beam splitter coatings 32 and 34 may be of the so-called dielectric type, signifying that no energy is absorbed by the beam splitter, itself. A third beam splitter 36 is imposed at the interface between the surfaces 16 and 24 of the two prisms 12 and 14, respectively. As was previously noted, the inner surface 38 of the substrate 6 also comprises a beam splitter arrangement.

A first sensor 40 and a second sensor 42 are positioned as will be hereinafter discussed adjacent to the first prism element 12. A third sensor 44 and a fourth sensor 46 are similarly positioned adjacent to the prism element 14.

The path of the beam 8 reflected and/or refracted through the prismatic structure is indicted by a single headed arrow. Thus a portion of the beam 8 is reflected at the surface 38 of the substrate 6 and reflected back down the opposite leg of the cavity 4. A second portion of the beam 8 is refracted at the substrate 6 and passes through the prism 14 to the surface 30. At the surface 30 a portion of the beam 8 is refracted through a first exit port at the beam splitter 34 to impinge upon the sensor 46. A second portion of the beam 8 is reflected at the surface 30 toward the interface 16, 24 between the two prisms 14 and 12. There it impinges upon the beam splitter 36. At the beam splitter 36, the beam 8 has a portion thereof reflected back into the prism 14, emerging from a second exit port at the surface 26 to impinge upon the detector or sensor 44. Another portion of the beam 8 is transmitted through the beam splitter 36 into the prism 12 and emerging from a third exit port at the surface 18 to impinge the sensor 40.

Similarly, the beam 10 impinges upon the beam splitter surface 38 of the substrate 6 where a portion of the beam 10 is reflected down the opposite leg of the cavity 4. A second portion of the beam 10 is refracted into the substrate 6 thence into the prism element 12 to impinge on the surface 22 at beam splitter 32. At the beam splitter 32, a fourth exit port, a first portion of the beam 10 is transmitted to the sensor 42. A second portion of the beam impinging of the beam splitter 32 is reflected back into the prism 12 to impinge upon the beam splitter 36 at the interface between the 2 surfaces 16 and 24. A first portion of the beam 10 impinging upon the beam splitter 36 is transmitted through that beam splitter into the prism element 14, emerging from the surface 26 thereof and impinging on the sensor 44. The second portion of the beam 10 impinging on the beam splitter 36 is reflected back into the prism 12 emerging from the surface 18 thereof and impinging on the sensor 40.

Following these paths on the single figure of the drawing it may be noted that the sensor 46 is arranged to receive only signals from the beam 8 while the sensor 42 receives only signals from the beam 10. On the other hand, the sensor 40 receives a combination of signals from the beams 8 and 10. Similarly the sensor 44 receives signals which are a combination of the superimposed beams 8 and 10.

As thus far described, the structure of the symmetrical prism assembly is quite similar to that shown and claimed in the aforementioned co-pending application of Callaghan, U.S. Ser. No. 482,665. As was herebefore pointed out, in the aforementioned Callaghan disclosure the prism elements 12 and 14 were bonded together by a suitable optical cement or adhesive. Similarly, the 2 prisms were bonded to the substrate 6, again by the use of a suitable optical cement. Again, in the co-pending application of Callaghan, the beam splitter 36 was defined as being either of the so-called dielectric type wherein no energy is absorbed by the beam splitter itself or of the metallic type which introduces a significant phase shift in the refracted relative to reflected beams.

In the present invention, beam splitter 36 is produced to have a somewhat high optical beam (wave) absorption or loss. If the optical absorption is of a sufficient amount, a substantially 90° phase shift can be imposed between the first and second double beam signals emerging from each side of beam splitter 36. In these circumstances, the output of detectors 40 and 44 can be phase compared to determine direction. It is analogous to two detectors spatially separated for monitoring a linear interference pattern, a technique well known. Optical absorption in beam splitter 36 is accomplished by using a thin film of a platinum coating which provides an absorption type coating.

It should be noted that although a 90° phase shift between the beam emerging from splitter 36 is most desirable, any phase shift which can be utilized to determine direction is all that is required to be within the scope of the present invention.

In accordance with the present invention, the beam splitter 36 comprised of platinum is on the order 50 to 100 Angstroms in thickness. In practicing the present invention, the surfaces 16 and 20 of the prism element 12 and the surfaces 24 and 28 of the prism element 14 as well as the outer surface of the substrate 6 are polished optically smooth and flat. One of the surfaces 16 or 24 is coated with the thin platinum film. When the two prism elements are positioned with surfaces 16 and 24 in juxtaposition, they will be rigidly adherent together by operation of a so-called optical bond. Similarly, the now coplaner surfaces 20 and 28 of the two prisms 12 and 14 are placed in juxtaposition to the outer surface of the substrate 6. Here, again, the elements will be rigidly adherent through the so-called optical bond. Because the platinum coating of the beam splitter 36 is so microscopically thin, the platinum coating will not interfere with the optical bonding between the surfaces 16 and 24 of the two prism elements 12 and 14 respectively.

As was herebefore noted, in the prior art devices which used the adhesive optical cement to bond the several elements together into a unitary structure, the cement itself changes dimensions as it cures. This change in dimension introduces instabilities, stresses and warpage of parts during the curing process. These tendencies necessitate a very tedious and time-consuming operation of adjusting the relative position of the components during the curing of the cement in order to maintain the optical viability of the system. Further, it occurs sometime that the amount of warpage or stress or instability is such that it cannot be adjusted during the assembly and results in the assembled system being rejected and unacceptable. In accordance with the present invention, the optical bonding, without intervening adhesive cement provides rigid bonding of the elements with no intervening medium to introduce the undesirable instabilities, stresses and warpage. This, in turn, simplifies the assembly procedure and greatly reduces the reject rate. With the prism elements being made of the same material as the reflector substrate, there is a perfect thermal matching of the components thereby obviating thermal stresses in the assembly.

Thus, there has been provided, in accordance with the present invention, an improved readout assembly for a ring laser gyro which obviates the shortcomings of the previous apparatus.

The embodiments of the invention in which an exclusive property or privilege is claimed are defined as follows:

1. An optical readout apparatus for a ring laser angular rate sensor comprising:
   an optically transparent substrate member having first and second major surfaces, said second major surface including a first beam splitter means; and
   a first prism element having
      a first surface perpendicular to a second surface thereof,
      a third surface being at a predetermined acute angle with respect to said first surface, a first beam reflecting means on said third surface for reflecting, back into said first prism element and toward said first surface thereof, beams entering through said second surface, passing uninterrupted through said first prism element between said second and third surfaces, and impinging on said first beam reflecting means, and
      said first surface including a platinum coating thereon to provide a second beam splitter means;
   a second prism element having
      a first surface perpendicular to a second surface thereof, said first surface of said first prism element being positioned in contiguous juxtaposition with respect to said first surface of said second prism element, said second surface of said first prism element being coplanar with said second surface of said second prism element, said first and second prism elements being bonded together at said first surface solely by an optical contact bond, and said coplanar second surfaces of said first and second prism elements being positioned in contiguous juxtaposition with said first major surface of said substrate member, and bonded thereto solely by an optical contact bond, said second beam splitter means being in the interface between said contiguous first surfaces of said first and second prism elements, and
      a third surface being at said predetermined acute angle with respect to said first surface, said third surface including a second beam reflecting means for reflecting, back into said second prism element toward said first surface thereof, beams entering through said second surface of said second prism element which passed through said second prism element between said second and third surfaces thereof, and impinging on said second beam reflecting means.

2. The readout apparatus as set forth in claim 1 wherein said predetermined acute angle is substantially 45 degrees.

3. The readout apparatus as set forth in claim 2 wherein said first and second beam reflecting means are third and fourth beam splitter means, respectively, said apparatus defining a predetermined path for a first one of a pair of laser beams impinging first on said first beam splitter means, next on said third beam splitter means, then on said second beam splitter means at the interface of said first and second prism elements, and a second path in which a second laser beam impinges on said first beam splitter means, next on said fourth beam splitter means, then on said second beam splitter means at the interface of said first and second prism elements, said apparatus establishing four exit ports for portions of said laser beams including (i) a portion of said first laser beam exiting from said third surface of said first prism element, (ii) a portion of said second laser beam exiting from said third surface of said second prism element, (iii) a first co-existing beam portion of said first and second laser beams exiting from a fourth surface of said first prism element, and (iv) a second co-existing beam portion of said first and second laser beams exiting from a fourth surface of said second prism element in which said first and second co-existing portions are phase shifted relative to each other, and detector means positioned adjacent to each of said exit beams to be responsive to energy from said portions of said first and second beams.

4. The apparatus of claim 1 wherein said thin film platinum coating is in the order of 50-100 angstroms in thickness.

* * * * *